Patented Apr. 21, 1931

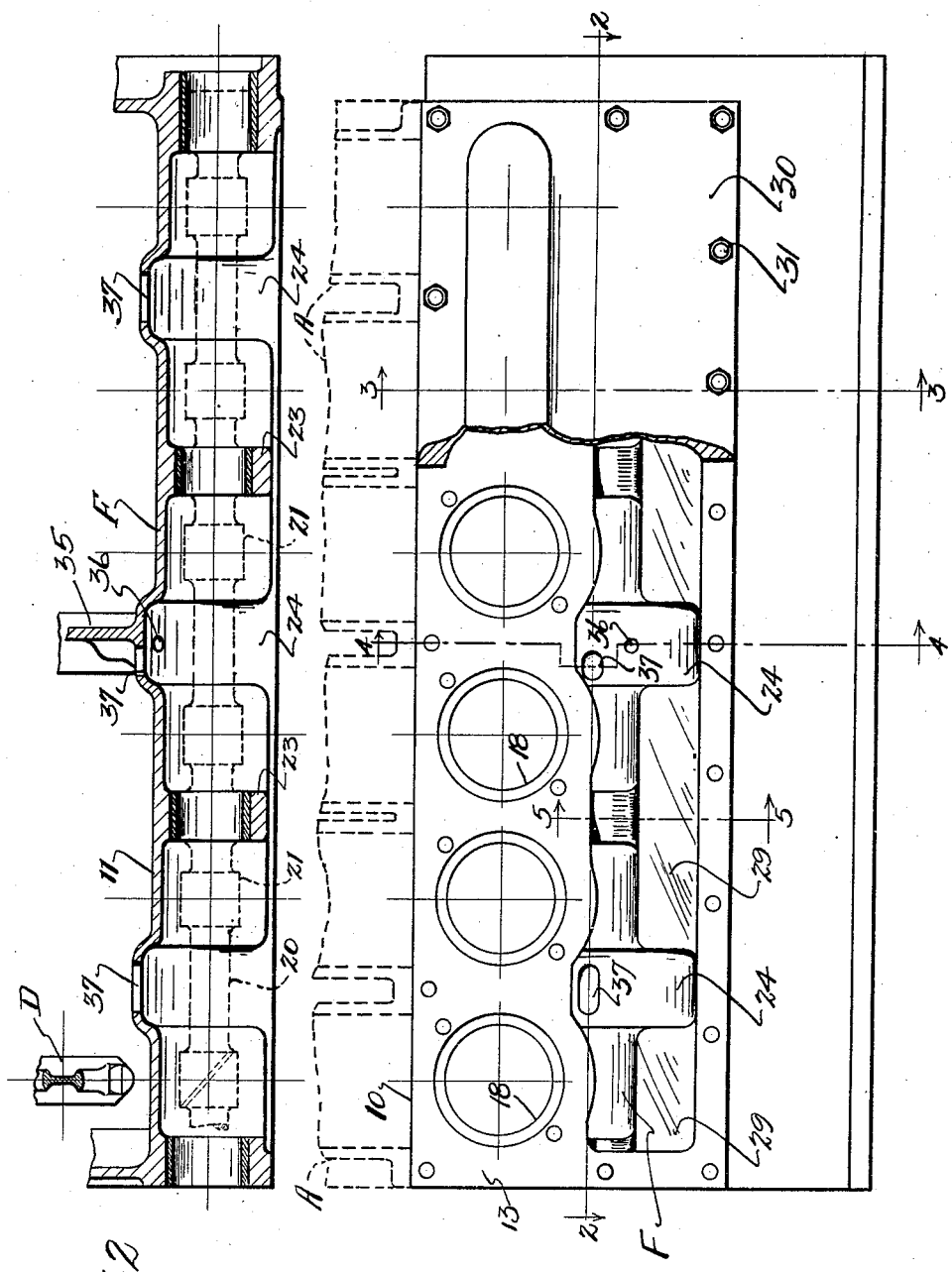

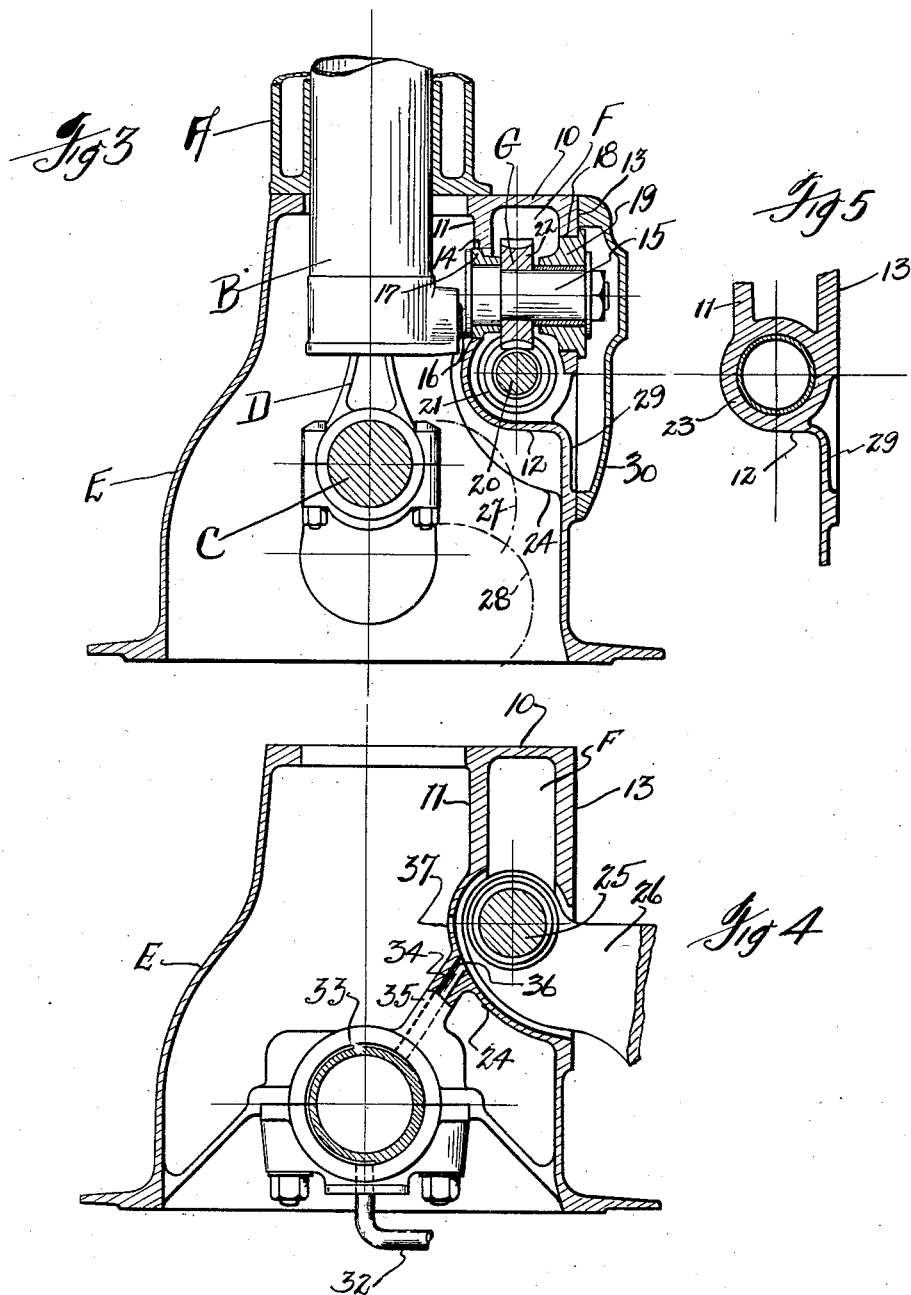

1,801,970

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE-VALVE ENGINE

Application filed March 18, 1927. Serial No. 176,334.

My invention relates to internal combustion engines and refers more particularly to engines of the general type known as sleeve valve engines.

One of the objects of my invention is to provide an improved casing construction for the sleeve valve driving mechanism. A further object of my invention resides in the provision of a sleeve drive casing constructed to provide a close nesting and compact arrangement of the sleeve drive mechanism tending to reduce the overall dimensions of the engine. I have further provided a casing construction which permits and facilitates in a novel manner the boring and machining of the bearings for the sleeve layshaft.

Other objects reside in providing an improved lubrication system and lubrication chamber for the sleeve drive mechanism.

With the above and other objects in view my invention resides in a novel combination and arrangement of parts more particularly hereinafter described and claimed.

Referring to the drawings in which like reference characters indicate corresponding parts, Fig. 1 is a side elevation view of the engine casing, a portion of the side cover being broken away, Fig. 2 is a plan section view along 2—2 of Fig. 1, Fig. 3 is a section view along 3—3 of Fig. 1.

Fig. 4 is a section view along 4—4 of Fig. 1 illustrating the manner of boring the layshaft bearings, and Fig. 5 is a section through a layshaft bearing along 5—5 of Fig. 1.

In Fig. 3 of the drawings reference character A represents one of the engine cylinders and B one of the sleeve valves preferably located within cylinder A and adapted to move in a combined reciprocating and oscillating path for controlling the engine and cylinder ports (not shown) in the usual or other preferred manner. C is the usual crankshaft and D a connecting rod for the piston (not shown) operating within sleeve B.

E represents a crank case section formed with a longitudinal extending compartment or pocket F which forms a housing or partial housing for the sleeve drive mechanism G. The pocket F may comprise a top wall 10, inner wall 11, and outer wall 13, these walls preferably being integral with the crank case section E. The wall 11 is provided with openings 14 spaced according to the cylinder arranged to permit passage through the wall of the sleeve actuator which may be in the form of a shaft 15 carrying a crank pin 16 for imparting the combined motion to the sleeve B. Openings 14 also provide for conveniently receiving bearings 17 for the shafts 15. Opposite the openings 14 are located openings 18 in the outer wall 13 which receive bearings 19 for the other ends of the shafts 15. The shafts 15 are driven from a valve actuating layshaft 20 having gears 21 spaced thereon for driving the gears 22 carried by shafts 15. The layshaft 20 may be driven from the crankshaft at a predetermined speed relatively thereto, as for example one half the engine speed. The pocket F is also formed with spaced bearings 23 for the layshaft 20. In order to facilitate boring and machining of the bearings 23 the wall 11 is formed with inwardly extending depressions 24 suitably spaced as between the bearings 23 in order to accommodate a boring bar 25 and steady rest 26 or like device for supporting and guiding a boring or machining tool whereby the bearings 23 may be machined. The depressions 24 are set inwardly of the crank case to a greater extent than the main lower portion 12 of the pocket F, and also these depressions 24 are spaced longitudinally of the connecting rods D, the construction thus avoiding interference with the outside paths 27, 28 of swinging of the rods D and at the same time affording ample space for accommodating the boring fixture 25. Furthermore the construction provides a compact arrangement of parts and a relatively small pocket F. This latter is important in that I partly fill the pocket with lubricating oil. The size of the oil pocket may be further reduced by carrying outwardly, as at 29, the lower portion of the pocket, this face 29 being interrupted by the recesses 24. The pocket F is completed to form an enclosure by the cover 30 suitably secured in place as by fastening members 31. The cover 31 may also be shaped to provide a suitable size lubricating oil reservoir in the bottom of the casing F.

Lubricating oil for the sleeve actuating mechanism G may be supplied at one or more points to the pocket or casing F. Oil is ordinarily supplied by conduit 32 to a main crankshaft bearing groove 33 and from this point the oil may be supplied by a conduit 34 through the crankcase web 35 to the pocket inlet 36. One or more oil outlets 37 is provided, positioned preferably above the inlet opening 36 so that a predetermined quantity of oil is maintained in the casing F, the overflow returning to the crankcase through outlets 37. The gears 21 will pick up the oil in the lower portion of pocket F so as to carry the oil to the gears 22 and bearings for the shafts 15.

Considering the crankcase section E it will be noted that a side wall thereof is longitudinally slotted adjacent the lower portion of the pocket F.

Various modifications of the structure shown for the purpose of illustrating my invention may be resorted to without departing from the scope of my invention.

What I claim as my invention is:

1. An internal combustion engine comprising a sleeve valve and mechanism for operating the sleeve, a casing structure for the said mechanism including an inner wall, said casing structure formed with spaced bearings and a depression intermediate the bearings extending inwardly beyond said inner wall for accommodating a bearing tool.

2. An internal combustion engine comprising a sleeve valve and mechanism for operating the sleeve, a crank case structure formed with a longitudinally extending pocket and transverse bearings for the said mechanism, said pocket formed with a depression extending inwardly of the crank case beyond said bearings for accommodating a bearing tool.

3. An internal combustion engine comprising a sleeve valve and mechanism for operating the sleeve, a crank case formed with a longitudinally extending pocket for the said mechanism, and a plurality of bearings transverse of the pocket, said pocket also formed with a depression offset longitudinally from said bearings for accommodating a bearing machining tool.

4. An internal combustion engine comprising a sleeve valve and mechanism for operating the sleeve, a crank case structure formed with a longitudinally extending pocket and transverse bearings for the said mechanism, said pocket formed with spaced depressions extending inwardly of the crank case beyond said bearings for accommodating a bearing tool.

5. An internal combustion engine comprising a sleeve valve and mechanism for operating the sleeve, and a crank case formed with a longitudinally extending pocket for the said mechanism, said pocket formed with spaced depressions extending inwardly of the crank case, one of said depressions being of greater depth than others.

6. An internal combustion engine comprising a sleeve valve and mechanism for operating the sleeve, and a casing for the said mechanism formed with a plurality of bearings, said casing having means extending within the crank case beyond said bearings for accommodating means for machining the bearings.

7. An internal combustion engine comprising a sleeve valve and mechanism for operating the sleeve, and a casing for the said mechanism formed with a plurality of bearings, said casing having means extending within the crankcase beyond said bearings for accommodating a bearing boring bar steady rest.

8. A casing construction for a sleeve valve operating mechanism comprising inner and outer walls formed with spaced aligned openings and spaced transverse bearings between said walls offset longitudinally of the casing from the said openings, the inner wall being formed with a lower curved portion formed with a plurality of recesses longitudinally spaced along the casing.

9. A casing construction for a sleeve valve operating mechanism comprising inner and outer walls formed with spaced aligned openings and spaced transverse bearings in said walls offset longitudinally of the casing from the said openings, the outer wall having a longitudinally extending opening below the said bearings in the said outer wall, and a cover for the last said opening.

10. An internal combustion engine comprising a sleeve valve, a crankshaft, a crank case structure housing the crankshaft, a connecting rod, sleeve valve operating mechanism, a casing for said mechanism, said casing being formed with an inner wall having a portion offset longitudinally to clear the connecting rod and inwardly of the crankcase, to accommodate a machining tool.

11. A sleeve valve operating mechanism and casing therefor, said mechanism comprising a layshaft having actuating gears spaced longitudinally thereof, sleeve actuating shafts extending transverse to the layshaft for operating the various sleeve valves and each provided with a gear driven by the said layshaft gears respectively, said casing comprising spaced inner and outer walls having bearings for said actuating shafts and openings for other bearings extending transversely to the said wall bearings for said layshaft, said outer wall having an opening in addition to the openings therein providing said bearings, and a cover for said outer wall opening.

12. A sleeve valve operating mechanism and casing therefor, said mechanism comprising a layshaft having actuating gears spaced longitudinally thereof and sleeve actuating shafts extending transverse to the layshaft for operating the various sleeve valves and each provided with a gear driven by the said layshaft gears respectively, said casing comprising spaced walls having bearings for said actuating shafts and other bearings extending transversely to the said wall bearings for said layshaft, said casing having a bearing machining tool receiving depression.

13. A sleeve valve operating mechanism and casing structure therefor, said mechanism comprising a layshaft having actuating gears spaced longitudinally thereof and sleeve actuating shafts extending transverse to the layshaft for operating the various sleeve valves and each provided with a gear driven by the said layshaft gears respectively, said casing comprising spaced inner and outer walls having bearings for said actuating shafts and other bearings extending transversely to the said wall bearings for said layshaft, said inner wall having a lower portion extending outwardly substantially to the plane of the outer wall, said outer wall having a lower edge spaced above the said outwardly extending portion of the inner wall.

14. A sleeve valve operating mechanism and casing therefor, said mechanism comprising a layshaft having actuating gears spaced longitudinally thereof, and sleeve actuating shafts extending transverse to the layshaft for operating the various sleeve valves and each provided with a gear driven by the said layshaft gears respectively, said casing comprising spaced walls having bearings for said actuating shafts and other bearings extending transversely to the said wall bearings for said layshaft, said spaced walls being connected at their lower ends by a casing portion curved about a portion of the said layshaft gears, the last said casing portion having longitudinally spaced depressed portions.

15. A sleeve valve operating mechanism and casing therefor, said mechanism comprising a layshaft having actuating gears spaced longitudinally thereof, and sleeve actuating shafts extending transverse to the layshaft for operating the various sleeve valves and each provided with a gear driven by the said layshaft gears respectively, said casing comprising spaced walls having bearings for said actuating shafts and other bearings extending transversely to the said wall bearings for said layshaft, said spaced walls being connected at their lower ends by a casing portion curved about a portion of the said layshaft gears, the last said casing portion having longitudinally spaced depressed portions located between adjacent layshaft gears.

16. A crankcase section for a sleeve valve engine having one of its side faces longitudinally slotted and provided with an interior substantially vertical wall spaced from the said crankcase side face to provide a pocket in the upper corner of the crankcase section, and sleeve relay driving mechanism within said pocket.

17. A crankcase section for a sleeve valve engine having one of its side faces longitudinally slotted and provided with an interior substantially vertical wall spaced from the said crankcase side face to provide a pocket in the upper corner of the crankcase section, said vertical wall having a curved lower portion connecting the crankcase side face below and adjoining the said slot.

18. A sleeve valve engine comprising a crankcase, a sleeve valve, a cylinder surrounding the sleeve valve, mechanism for operating the sleeve valve, said crankcase being provided with a pocket containing a portion of said sleeve operating mechanism and provided with lubricant inlet and outlet ports, said crankcase having a web formed with a lubricant conducting passage to the said lubricant inlet, said outlet port communicating with the crank case.

19. A sleeve valve engine comprising a crankcase, a sleeve valve, a cylinder surrounding the sleeve valve, mechanism for operating the sleeve valve, said crankcase being provided with a pocket containing a portion of said sleeve operating mechanism and provided with lubricant inlet and outlet ports, means within the crankcase for conducting lubricant to the said inlet port, and a cover member forming with the pocket a reservoir for said lubricant.

20. A sleeve valve engine comprising a crankcase, a sleeve valve, a cylinder surrounding the sleeve valve, mechanism for operating the sleeve valve, said crankcase being provided with a pocket containing a portion of said sleeve operating mechanism and provided with lubricant inlet and outlet ports, said crankcase having a web formed with a lubricant conducting passage to the said lubricant inlet, said outlet port communicating with the crank case and a cover member forming with the pocket a reservoir for said lubricant.

21. A sleeve valve engine comprising, a crankshaft, a crankcase having a bearing therein for the crankshaft, a sleeve valve, mechanism for operating the sleeve valve, said crankcase being provided with a pocket containing a portion of said sleeve operating mechanism, said crankcase having a web provided with a lubricant conducting passage whereby lubricant is supplied from the crankshaft bearing to the crankcase pocket for lubricating the sleeve operating mechanism contained therein.

22. A sleeve valve engine comprising, a crankshaft, a crankcase having a bearing therein for the crankshaft, a sleeve valve, mechanism for operating the sleeve valve, said crankcase being provided with a pocket containing a portion of said sleeve operating mechanism, said crankcase having a web provided with a lubricant conducting passage whereby lubricant is supplied from the crankshaft bearing to the crankcase pocket for lubricating the sleeve operating mechanism contained therein, said pocket provided with a lubricant outlet port through which lubricant from the pocket is passed to the crankcase.

23. A sleeve valve engine comprising, a crankshaft, a crankcase having a bearing therein for the crankshaft, a sleeve valve, mechanism for operating the sleeve valve, said crankcase being provided with a pocket containing a portion of said sleeve operating mechanism, said crankcase having a web provided with a lubricant conducting passage whereby lubricant is supplied from the crankshaft bearing to the crankcase pocket for lubricating the sleeve operating mechanism contained therein, said pocket provided with a lubricant outlet port through which lubricant from the pocket is passed to the crankcase, said pocket outlet port being spaced above the pocket lubricant inlet whereby a predetermined quantity of lubricant is maintained within said pocket.

In witness whereof, I hereunto subscribe my name this 15th day of March, A. D. 1927.

ARCHIE MACPHAIL NIVEN.